(12) United States Patent
Erb

(10) Patent No.: US 7,140,464 B2
(45) Date of Patent: Nov. 28, 2006

(54) TRIGGERING UNIT

(75) Inventor: Yannick Erb, Eragny sur Oise (FR)

(73) Assignee: Autoliv Development AB, Vargarda (SE)

( * ) Notice: Subject to any disclaimer, the term of this patent is extended or adjusted under 35 U.S.C. 154(b) by 230 days.

(21) Appl. No.: 10/610,365

(22) Filed: Jun. 30, 2003

(65) Prior Publication Data

US 2004/0034458 A1 Feb. 19, 2004

(30) Foreign Application Priority Data

Jul. 2, 2002 (GB) .................................. 0215277.5

(51) Int. Cl.
*B60K 28/12* (2006.01)
(52) U.S. Cl. ...................... 180/282; 280/735; 701/301
(58) Field of Classification Search ................ 280/735; 180/274, 282; 340/903; 701/301
See application file for complete search history.

(56) References Cited

U.S. PATENT DOCUMENTS

| 5,285,188 A | * | 2/1994 | Yoshida ....................... 340/436 |
| 5,648,473 A | * | 7/1997 | Chou ........................... 536/18.4 |
| 5,899,946 A |   | 5/1999 | Iyoda |
| 5,935,182 A | * | 8/1999 | Foo et al. ..................... 701/45 |
| 5,936,549 A | * | 8/1999 | Tsuchiya .................... 340/903 |
| 6,087,975 A | * | 7/2000 | Sugimoto et al. ............. 342/70 |
| 6,206,129 B1 |   | 3/2001 | Breed et al. |
| 6,271,747 B1 | * | 8/2001 | Fendt et al. ................ 340/436 |
| 6,498,972 B1 | * | 12/2002 | Rao et al. ..................... 701/45 |
| 6,757,611 B1 | * | 6/2004 | Rao et al. ................... 701/301 |
| 6,819,991 B1 | * | 11/2004 | Rao et al. ..................... 701/45 |

FOREIGN PATENT DOCUMENTS

| DE | 199 12 301 | 1/2001 |
| EP | 0 536 997 | 4/1993 |
| EP | 0 715 991 | 6/1996 |
| GB | 2 343 977 | 5/2000 |

* cited by examiner

*Primary Examiner*—David R. Dunn
*Assistant Examiner*—Toan C. To
(74) *Attorney, Agent, or Firm*—Madson & Austin

(57) ABSTRACT

A triggering unit is disclosed for use in triggering a safety device in a motor vehicle to protect an occupant of the vehicle in an impact situation in which the vehicle impacts with an impacting object. The triggering unit is configured to actuate the safety device only for total stiffness between the vehicle and the impacting object exceeds a predetermined stiffness value. The unit incorporates a calculating arrangement to calculate stiffness from two or more sensed parameters.

11 Claims, 1 Drawing Sheet

TRIGGERING UNIT

BACKGROUND OF THE INVENTION

1. Field of the Invention

THE PRESENT INVENTION relates to a triggering unit and more particularly relates to a triggering unit configured to trigger or control the actuation deployment of a safety device in a motor vehicle.

2. Description of Related Art

It has been proposed to provide many safety devices in motor vehicles such as air-bags and safety-belt pretensioners. It is necessary to provide a triggering device to trigger such a safety device at an appropriate instant during an accident situation. In recent years many safety devices have been developed which may be deployed in different modes, depending upon the severity of the crash. For example, the amount of gas injected into an air-bag or the tension applied to a safety belt pretensioner may be selected in dependence upon the severity of the crash. Therefore a triggering arrangement should ideally be able to trigger a safety device and also should be able to control or adapt the deployment or actuation of the safety device so that the safety device is deployed or actuated in an appropriate manner depending upon the severity of the crash.

When a crash detector system only has to determine whether a safety device should or should not be actuated or deployed, a single sensor could be utilised in the form of a central accelerometer. The signal derived from the accelerometer indicates the degree of deceleration of the vehicle, and thus this signal is used to control the deployment of the safety device.

With a single central accelerometer it is exceedingly difficult to determine the severity of a crash before the time which the safety device should be actuated or deployed. It is more common now to use safety systems where the severity of the crash must be determined and the designers of these systems have determined that a single central accelerometer is not sufficient. It has been proposed to use an additional accelerometer, or, alternatively, to use some sort of "radar" mounted in the front of the vehicle to determine the relative speed between the vehicle and an object with which the vehicle is going to collide just before the collision. The radar may be a doppler radar or may be an ultrasonic radar.

When a system of this type is utilised, the threshold change in velocity necessary for deployment or actuation of the safety device may be adjusted in dependence upon the measured relative speed between the vehicle and the object with which there is to be a collision. The present invention seeks to provide an improved triggering unit which may provide an enhanced operating characteristic.

SUMMARY OF THE INVENTION

According to a first aspect of the present invention, there is provided a triggering unit to trigger a safety device in a motor vehicle to protect an occupant of the vehicle in an impact situation in which the vehicle impacts with an impacting object, the triggering unit being configured to actuate the safety device only if the total stiffness between the vehicle and the impacting object exceeds a predetermined stiffness value, the unit incorporating a calculating arrangement to calculate stiffness from two or more sensed parameters, the stiffness being defined as the quotient between the force between: the vehicle and the impacting object, and the decrease in distance between the centers of gravity of the vehicle and the impacting object after contact between the vehicle and the impacting object.

According to another aspect of the present invention, there is provided a triggering unit to trigger a safety device in a motor vehicle to protect an occupant of the vehicle in an impact situation in which the vehicle impacts with an impacting object, the triggering unit being configured to actuate the safety device only if the total stiffness between the vehicle and the impacting object exceeds a predetermined stiffness value, the unit incorporating a calculating arrangement to calculate stiffness from two or more sensed parameters, the unit incorporating arrangements to sense the said two parameters in the form of a sensor to sense relative velocity between the vehicle and the impacting object immediately prior to impact, and an accelerometer provided on the vehicle, the stiffness being calculated as a function of sensed acceleration and as an inverse function of relative velocity and elapsed time.

Preferably, total stiffness is calculated as being related to $(M_1 \cdot a_{1c})/(v_r \cdot t)$ where $M_1$ is the mass of the vehicle, $a_{1c}$ is an output from a central accelerometer on the vehicle, $v_r$ is the relative velocity between the vehicle and the impacting object prior to impact and the t is the time elapsed from the commencement of the impact.

Advantageously, the unit is configured so that the value of stiffness is updated during the course of the impact.

Conveniently, the predetermined stiffness value is substantially inversely proportional to the $p^{th}$ power of the relative speed, where $p>1$.

Preferably, the unit is configured to trigger the safety device only if a change in velocity of the vehicle exceeds a specific predetermined value.

Advantageously, there are two said predetermined stiffness values, the triggering unit being adapted to actuate the safety device in a first mode of operation if a first predetermined threshold stiffness value is exceeded and in another mode of operation if a second predetermined threshold stiffness value is exceeded.

According to a further aspect of the present invention, there is provided a triggering unit for triggering a safety device in a vehicle for protecting an occupant of the vehicle in an impact situation in which the vehicle impacts with an impacting object immediately prior to impact the unit incorporating an accelerometer to determine acceleration applied to the vehicle, and a sensor to sense the relative velocity between the vehicle and the impacting object immediately prior to impact, the triggering unit being configured to actuate the safety device only if the determined acceleration multiplied by relative speed raised to the power q, where q is >0, divided by the time from the start of impact is greater than a predetermined invariable value.

BRIEF DESCRIPTION OF THE DRAWINGS

In order that the invention may be more readily understood and so that further features thereof may be appreciated, the invention will now be described, by way of example, with reference to the accompanying drawings in which.

DETAILED DESCRIPTION OF THE INVENTION

It has been found that a good way to determine the severity of a crash or impact is to rely on the use of the "total stiffness" between a vehicle and an object with which the vehicle is to collide, such as for example a second vehicle.

Figure 1:
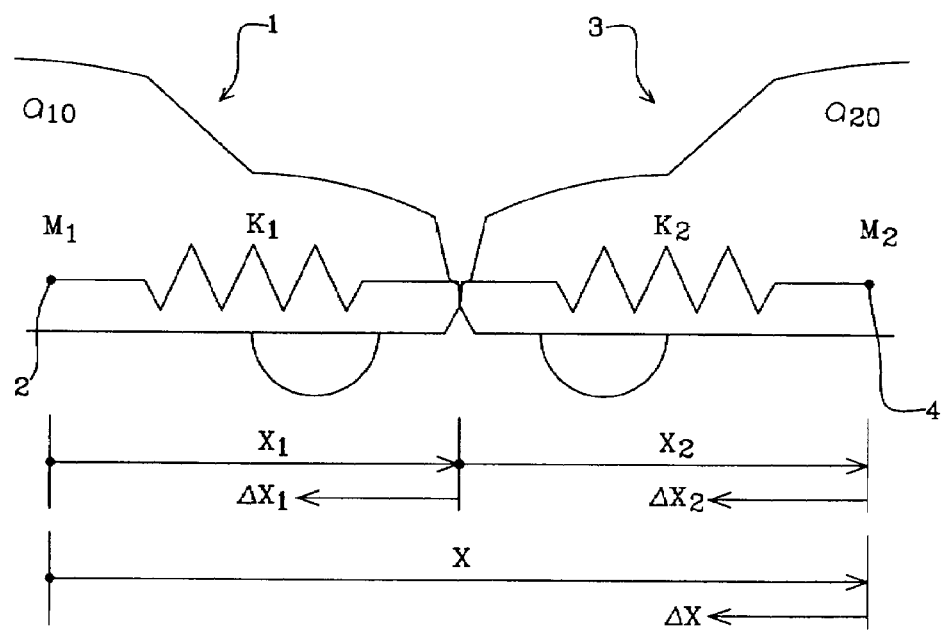
FIG. 1 is a diagrammatic view of two vehicles colliding, provided for purposes of explanation.

FIG. 1 illustrates, diagrammatically, a first vehicle 1 having a mass $M_1$ which defines a center of gravity 2. The first vehicle 1 is shown colliding with a second vehicle 3. The second vehicle 3 has a mass $M_2$ which is centered at a center of gravity 4.

The total stiffness between the two colliding vehicles 1,3 illustrated diagrammatically in FIG. 1 can be defined as the quotient between the force F which is the force acting between the mass of the first vehicle 1 and the mass of the second vehicle 3 as a consequence of the impact, and the decrease in distance between the center of gravity of the two vehicles after the collision has occurred. The initial distance between the two centers of gravity is denoted by x. The first vehicle 1 is associated with a portion of this distance identified as $x_1$ and the vehicle 3 is also associated with a portion of this distance shown as $x_2$. The decrease in distance between the centers of gravity can be defined as $\Delta x$. The decrease in distance $\Delta x$ may again be apportioned between the vehicles, the first vehicle 1 being associated with an apportionment $\Delta x_1$ and the second vehicle 3 being associated an apportionment of $\Delta x_2$.

The stiffness of each object can be regarded to be equivalent to spring constants $K_1$, $K_2$ (shown diagrammatically in FIG. 1) of springs acting in a similar way as the chassis of each of the vehicles. The chassis of a vehicle may not, of course, be resiliently deformed during an impact, but instead may be deformed in a plastic manner. However, the concept of the spring constant is useful as can be seen from the following equations. Here it should be explained that $a_{1c}$ denotes acceleration of the first vehicle 1 as measured by a central accelerometer and $a_{2c}$ is the acceleration of the second vehicle 3 as measured by a central accelerometer. It is also to be understood that $v_r$ denotes the relative speed between the vehicles just before a crash.

It can be understood that the following relations are valid:

$$K_1 = F/\Delta x_1; \; K_1 = F/\Delta x_2; \; \Delta x = \Delta x_1 + \Delta x_2 = F(1/K_1 + 1/K_1)$$
$$= F/K$$

As $F = M_1 \cdot a_{1c}$ and $\Delta x = V_r \cdot t - \int\int(a_{1c} + a_{2c})dt$ $$K = (M_1 \cdot a_{1c})/(vr \cdot t - \int\int(a_{1c} + a_{2c})dt)$$

Both $K_1$ and $K_2$ are intrinsically related to the structure of the relevant vehicle 1, 3, but are also related to the size and shape of the other vehicle, the lateral displacement and angle of the crash. FIG. 1 shows a "head on" impact, but many crashes may be oblique impacts. For many crashes K is almost constant, that is to say independent of $\Delta x$, but for other crashes K may not be constant and may vary with time. For example, if one vehicle impacts with a fixed vertical object such as a pole, it has been found that K increases towards the end of the time period during which the crash is occurring.

However, for the initial phase of the crash, for example the first 15–20 ms, which may represent the first $6^{th}$ part of the crash, it has been found that $$\int\int(a_{1c} + a_{2c})dt \ll v_r \cdot t$$

It is to be noted, from the point of view of any system mounted on the first vehicle 1, that the term $a_{2c}$ cannot be measured or calculated. If it was possible to obtain information concerning the size of the second vehicle 3, and to determine whether the second vehicle 3 is stationary before the impact, then this could be used to lead to an estimate being prepared of the mass $M_2$ of the second vehicle 3, and from that $$a_{2c} = a_{1c} \cdot M_1/M_2$$

In any event, it has been found that during the initial phase of a crash, that is to say the first 15–20 ms $$K \approx (M_1 \cdot a_{1c})/(v_r \cdot t)$$

Thus, by determining relative velocity between the first vehicle 1 and an object that the first vehicle 1 is about to collide with (i.e the second vehicle 3 in the example given) to determine $v_r$, and by generating a signal representative of $a_{1c}$ from a central accelerometer which indicates the acceleration or deacceleration being experienced by the first vehicle 1, and, of course, knowing (at least approximately) the mass $M_1$ of the first vehicle 1 it is possible to determine a value for the spring constant K at any instant of time t during the impact situation.

Figure 2:
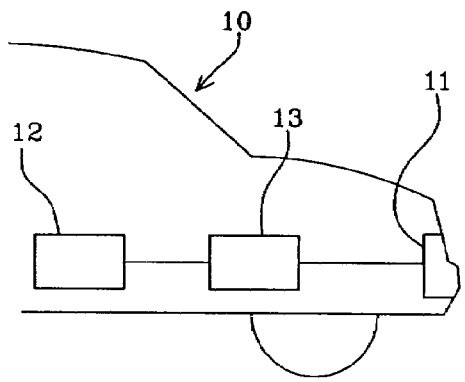
FIG. 2 is a view of the vehicle provided with a triggering unit in accordance with the invention.
Figure 3:
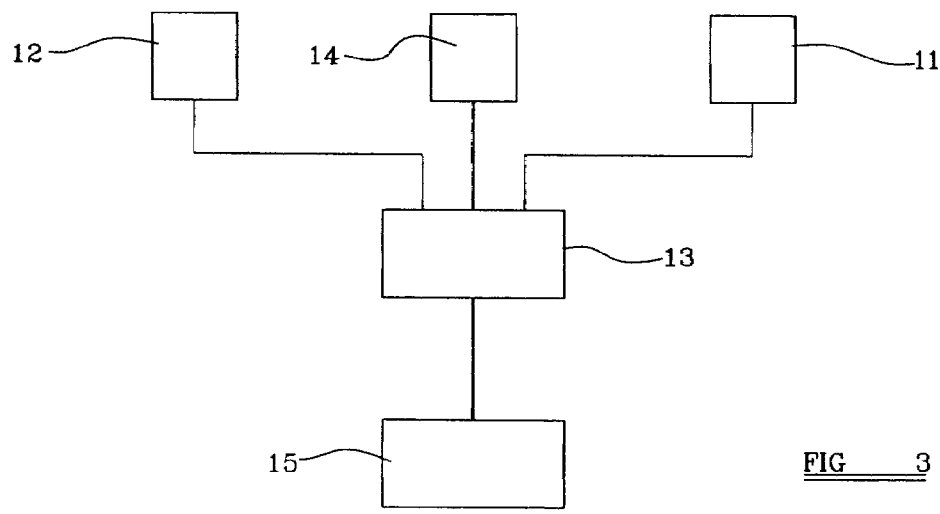
FIG. 3 is a block diagram of one embodiment of a triggering unit in accordance with the invention.

FIG. 2 illustrates schematically part of a vehicle 10 provided with a triggering unit to trigger a safety device. A doppler radar 11 is provided located at the front of the vehicle 10, the doppler radar 11 being configured to determine, immediately before an impact, the relative speed between the vehicle 10 and an object or another vehicle with which the vehicle 10 is to collide. The output of the doppler radar 11 may be stored in a short-term memory so that, should an impact occur the relative speed between the vehicle 10 and the object with which the impact has occurred, which would have been stored in the memory shortly before the impact, can be extracted from the memory and utilised. The vehicle 10 is also provided with a central accelerometer 12 and a control unit 13 to which the doppler radar 11 and the central accelerometer 12 are operatively connected. As shown in FIG. 3, which is a block diagram of the triggering unit provided in the vehicle 10 of FIG. 2, the control unit 13 may also receive information from a second accelerometer 14. The control unit 13 is configured to provide a control or triggering signal to a safety device 15. The safety device 15 may be an air-bag, a safety-belt pretensioner, or some other safety device. The control unit 13 generates a triggering signal to ensure that the safety device 15 is deployed at an appropriate instant during the accident, and the triggering signal may be such that the manner or nature of deployment of the safety device 15 is adapted to be suitable for the particular circumstances of the impact that is detected.

Dealing, for the sake of simplicity, with one safety device 15, for example in the form of an air-bag, which can be deployed in two modes of deployment, for example with a complete charge of gas so that the bag is completely inflated, or with a half charge of gas so that the bag is half inflated, it can be seen that two threshold spring constants $K_{1Th}$, $K_{2Th}$ may be defined. Then if $$K > K_{1Th}$$

the safety device 15 may be triggered in the first mode of deployment and if $$K > K_{2Th}$$

the safety device 15 may be triggered with the second mode of operation. Of course, either of the threshold values $K_{1Th}$ or $K_{2Th}$ may be adjustable thresholds, and could be adjusted in dependence upon various parameters such as the absolute speed of the vehicle 10 and the relative velocity between the vehicle 10 and the object or other vehicle with which it is to collide.

It has been found that making either $K_{1Th}$ or $K_{2Th}$ to be proportional to Const./$v_r^p$ where p>1, a good criteria for crash severity is provided. Different values of "p" may be selected for different types of vehicles.

At least for the initial part of the crash, which may be the whole of the time taken until the safety device 15 is actually triggered, the triggering criteria will be $$K \approx (M_1.a_{1c})/(v_r.t) > \text{Const.}/v_r^p \rightarrow (a_{1c}.v_r^{p-1})/t > \text{Const.}$$

This shows that for a value of p which is close to 1, the dependence on relative velocity $v_r$ is weak, but as p gets bigger, the dependence on relative velocity $v_r$ increases.

Therefore, because p>1, this triggering criteria can be re-written as $$K \approx \frac{a_{1c} \cdot v_r^q}{t} > const.$$

where q>0, $a_{1c}$=central acceleration of the vehicle (determined using the second accelerometer 14), $v_r$=the relative velocity between the vehicle and the impacting object immediately prior to impact, t=time from start of impact and const.=a predetermined invariable threshold value.

The complete criteria for triggering the safety device 15 could, of course, include another threshold that has to be met. Thus, for example, the change in velocity Δv of the vehicle 10 should exceed the threshold $v_t$ where the threshold may be a function of other parameters such as, again, the speed of the vehicle before the impact and the relative velocity. Δv may be determined using the second accelerometer 14, the output of the accelerometer 14 being integrated with respect to time.

It is possible that most complex criteria may be utilised in the control unit 13 including a classification of the type of crash. By this it is meant a determination as to whether the crash is involving another vehicle, or a rigid barrier, or a pole, etc. It is also possible to classify crashes with regard to the relative speed between the vehicle and the object with which there is to be an impact shortly before the impact, the angle of the impact and the lateral displacement of the other object. Various sensors may be utilised to provide information necessary to effect such a classification. Many types of crashes can be classified by comparing the level or shape of the spring stiffness K as measured over a period of time against various "templates" which are indicative of specific types of crash. Such a classification may contribute to the determination of the appropriate moment to trigger the safety device and the appropriate mode of triggering of the safety device.

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A triggering unit to trigger a safety device in a motor vehicle to protect an occupant of the vehicle in an impact situation, in which the vehicle impacts with an impacting object, the triggering unit being configured to actuate the safety device only if the total stiffness between the vehicle and the impacting object exceeds a predetermined stiffness value, the unit incorporating a calculating arrangement to calculate stiffness from the sensed acceleration of the vehicle and sensed relative velocity between the vehicle and impacting object, the stiffness being defined as the quotient between: the force between: the vehicle and the impacting object, and the decrease in distance between the centers of gravity of the vehicle and the impacting object after contact between the vehicle and the impacting object.

2. A unit according to claim 1 wherein the unit is configured so that the value of the total stiffness is updated during the course of the impact.

3. A unit according to claim 1 where in the unit is configured to trigger the safety device if the change in velocity of the vehicle also exceeds a specific predetermined value.

4. A unit according to claim 1 where there are two said predetermined stiffness values, the triggering unit being adapted to actuate the safety device in a first mode of operation if a first predetermined threshold stiffness value is exceeded and in another mode of operation if a second predetermined threshold stiffness value is exceeded.

5. A triggering unit to trigger a safety device in a motor vehicle to protect an occupant of the vehicle in an impact situation in which the vehicle impacts with an impacting object, the triggering unit being configured to actuate the safety device only if the total stiffness between the vehicle and the impacting object exceeds a predetermined stiffness value, the unit incorporating a calculating arrangement to calculate stiffness from two or more sensed parameters in the form of a sensor to sense relative velocity between the vehicle and the impacting object immediately prior to impact, and an accelerometer provided on the vehicle, the stiffness being calculated as a function of sensed acceleration and as an inverse function of relative velocity and elapsed time.

6. A unit according to claim 5, wherein total stiffness is calculated as being related to $(M_1.a_{1c})/(v_r.t)$ where $M_1$ is the mass of the vehicle, $a_{1c}$, is an output from a central accelerometer on the vehicle, $v_r$ is the relative velocity between the vehicle and the impacting object prior to impact and the t is the time elapsed from the commencement of the impact.

7. A unit according to claim 5 wherein the unit is configured so that the value of stiffness is updated during the course of the impact.

8. A unit according to claim 5 wherein the predetermined stiffness value is substantially inversely proportional to the pth power of the relative speed, where p>1.

9. A unit according to claim 5 wherein the unit is configured to trigger the safety device if the change in velocity of the vehicle also exceeds a specific predetermined value.

10. A unit according to claim 5 where there are two said predetermined stiffness values, the triggering unit being adapted to actuate the safety device in a first mode of operation if a first predetermined threshold stiffness value is exceeded and in another mode of operation if a second predetermined threshold stiffness value is exceeded.

11. A triggering unit for triggering a safety device in a vehicle for protecting an occupant of the vehicle in an impact situation in which the vehicle impacts with an impacting object the unit incorporating an accelerometer to determine acceleration applied to the vehicle, and a sensor to sense the relative velocity between the vehicle and the impacting object immediately prior to impact, the triggering unit being configured to actuate the safety device only if the determined acceleration multiplied by relative speed, raised to the power q, where q>0, divided by the time from the start of impact is greater than a predetermined invariable value.

* * * * *